United States Patent
Jagannathan et al.

(10) Patent No.: US 9,739,896 B2
(45) Date of Patent: *Aug. 22, 2017

(54) COATINGS FOR DIGITAL DETECTORS

(71) Applicant: CARESTREAM HEALTH, INC., Rochester, NY (US)

(72) Inventors: Seshadri Jagannathan, Rochester, NY (US); Timothy J. Tredwell, Fairport, NY (US); Charles M. Rankin, Penfield, NY (US); David Gruszczynski, Webster, NY (US); Daniel M. Leusch, Penfield, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/354,140

(22) Filed: Nov. 17, 2016

(65) Prior Publication Data

US 2017/0068002 A1    Mar. 9, 2017

Related U.S. Application Data

(63) Continuation of application No. 13/775,639, filed on Feb. 25, 2013, now abandoned.

(60) Provisional application No. 61/603,980, filed on Feb. 28, 2012.

(51) Int. Cl.
| | | |
|---|---|---|
| *G01T 1/20* | (2006.01) | |
| *B05D 3/12* | (2006.01) | |
| *G01T 1/161* | (2006.01) | |

(52) U.S. Cl.
CPC .............. *G01T 1/2012* (2013.01); *B05D 3/12* (2013.01); *G01T 1/161* (2013.01); *G01T 1/20* (2013.01); *G01T 1/2006* (2013.01)

(58) Field of Classification Search
CPC .......... G01T 1/2012; G01T 1/161; G01T 1/20
USPC ...................................... 250/361 R
See application file for complete search history.

(56) References Cited

U.S. PATENT DOCUMENTS

| | | |
|---|---|---|
| 3,043,710 A | 7/1962 | Patten et al. |
| 3,525,621 A | 8/1970 | Miller |
| 3,615,454 A | 10/1971 | Cescon et al. |
| 3,883,747 A | 5/1975 | Murashige et al. |

(Continued)

FOREIGN PATENT DOCUMENTS

JP    2010-019620    1/2010

OTHER PUBLICATIONS

International Search Report, International application No. PCT/US2013/027757, Mailing date Jun. 21, 2013, 2 pages.

*Primary Examiner* — David Porta
*Assistant Examiner* — Gisselle Gutierrez

(57) ABSTRACT

Described is a scintillator screen that includes a supporting layer having a phosphor dispersed in a polymeric binder disposed on the supporting layer and a barrier layer disposed on the polymeric binder. The barrier layer includes a non-moisture absorbing polymer selected from the group consisting of polyethylene terephthalate, cellulose diacetate, ethylene vinyl acetate and polyvinyl butyraldehyde. The barrier layer has a thickness of less than 1 micron. An antistatic layer is disposed on the barrier layer. The antistatic layer includes poly(3,4-ethylenedixythiophene)-poly(styrene sulfonate) (PEDOT/PSS) dispersed in a polymer selected from the group consisting of a polyester and a polyurethane. The antistatic layer has a transparency of greater than 95 percent at a wavelength of from about 400 nm to 600 nm.

16 Claims, 1 Drawing Sheet

(56) References Cited

U.S. PATENT DOCUMENTS

| | | |
|---|---|---|
| 4,204,125 A | 5/1980 | Fatuzzo et al. |
| 4,547,445 A | 10/1985 | Asahina et al. |
| 4,791,009 A | 12/1988 | Arakawa et al. |
| 4,845,369 A | 7/1989 | Arakawa et al. |
| 5,244,728 A | 9/1993 | Bowman et al. |
| 5,334,843 A | 8/1994 | Zeman |
| 5,466,536 A | 11/1995 | Berner et al. |
| 5,683,862 A | 11/1997 | Majumdar et al. |
| 6,346,370 B1 | 2/2002 | Majumdar et al. |
| 6,541,773 B1 | 4/2003 | Iwabuchi et al. |
| 7,304,317 B2 | 12/2007 | Bermel et al. |
| 7,532,264 B2 | 5/2009 | Yuan et al. |
| 7,902,004 B2 | 3/2011 | Weisfield et al. |
| 9,079,217 B2 | 7/2015 | Jagannathan et al. |
| 9,211,565 B2 | 12/2015 | Jagannathan et al. |
| 2002/0168157 A1 | 11/2002 | Walker et al. |
| 2004/0164251 A1 | 8/2004 | Bergh et al. |
| 2004/0178350 A1 | 9/2004 | Nagano et al. |
| 2008/0237481 A1 | 10/2008 | Zentai et al. |
| 2009/0261259 A1 | 10/2009 | Yip |
| 2010/0091149 A1 | 4/2010 | Weisfield et al. |
| 2011/0121185 A1 | 5/2011 | Hirai et al. |
| 2011/0133093 A1 | 6/2011 | Jagannathan et al. |
| 2013/0220514 A1 | 8/2013 | Jagannathan et al. |
| 2013/0221225 A1 | 8/2013 | Jagannathan et al. |
| 2013/0221229 A1 | 8/2013 | Jagannathan et al. |

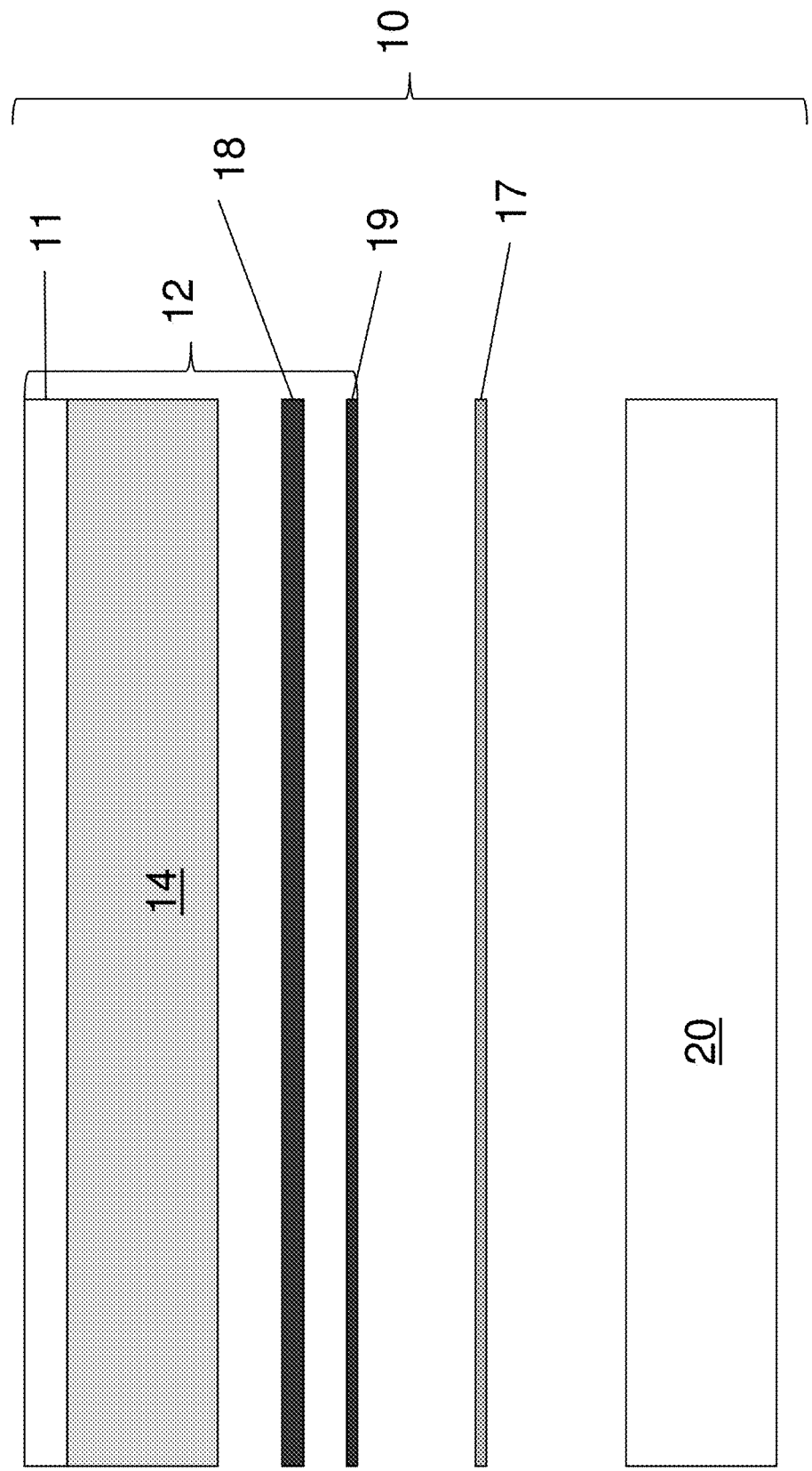

COATINGS FOR DIGITAL DETECTORS

CROSS REFERENCE TO RELATED APPLICATIONS

This application is a Continuation of U.S. Ser. No. 13/775,639, filed Feb. 25, 2013, entitled COATINGS FOR DIGITAL DETECTORS, which claims the benefit of U.S. provisional 61/603,980, filed Feb. 28, 2012, entitled FUNCTIONAL COATINGS FOR DIGITAL DETECTORS, both of which are hereby incorporated by reference in their entirety.

Reference is made to commonly assigned applications: (1) U.S. Ser. No. 13/775,600, filed Feb. 25, 2013, entitled METHOD OF MANUFACTURING DIGITAL DETECTORS, which granted on Jul. 14, 2015 as U.S. Pat. No. 9,079,217; and (2) U.S. Ser. No. 13/775,679, filed Feb. 25, 2013, entitled ADHESIVE LAYER FOR DIGITAL DETECTORS, which granted on Dec. 15, 2015 as U.S. Pat. No. 9,211,565; both of which are hereby incorporated by reference in their entirety.

FIELD OF INVENTION

The present invention relates to digital radiography screens.

BACKGROUND

Digital radiography is an alternative to film-based imaging technologies that rely on photosensitive film layers to capture radiation exposure and thus to produce and store an image of a subject's internal physical features. With digital radiography, the radiation image exposures captured on radiation-sensitive layers are converted, pixel by pixel, to electronic image data which is then stored in memory circuitry for subsequent read-out and display on suitable electronic image display devices.

The primary objective of a radiographic imaging detector is to accurately reproduce the organ or the object that is being imaged, while exposing the patient (in medical and dental applications) or the object (in non-destructive testing) to a minimal amount of x-rays.

In digital radiography, scintillating screens are used to convert x-rays to visible radiation. The visible radiation is converted by photosensitive elements (e.g., amorphous silicon) into electrical signals that are processed by associated circuitry. In order to accurately image an organ or element, and at the same time, minimize the exposure of the patient or the object to the x-rays, it is necessary to place the scintillator screen in intimate contact with the photosensitive element, and ensure that the circuitry associated with the detection of the signal due to the radiation, is able to detect very small levels of electrical charge.

For example, creation of scintillator screens by coating a formulation of scintillator particles, polymeric binders, and other additives on a polymeric support is disclosed in U.S. Pat. Nos. 3,883,747 and 4,204,125. However, when these scintillator screens and the radiographic detectors are brought together in intimate contact, the sensitivity of the combination has to be manipulated to ensure that electrostatic discharge (ESD) events generated due to triboelectric phenomena do not induce artifacts in the radiographic image or damage the radiographic detector, which require fairly sophisticated & expensive processes to manufacture.

A number of approaches have been taken to minimize the impact of ESD events on digital radiographic detectors. The deposition of conductive coatings on the surface of the detector to spread out the charge generated by the ESD event and circuitry to dissipate the charge is described in U.S. Pat. Pub. 2010/0091149A1, U.S. Pat. Pub. 2008/0237481A1, U.S. Pat. Nos. 7,532,264 and 7,902,004. However, this approach leads to the decrease in the overall sensitivity of the photosensitive detector.

It would be desirable to minimize the probability of an ESD event due to tribocharging and to diminish the magnitude of the charge generated in the case of an ESD event, while maintaining the sensitivity of the photoelectric detector. In addition, it is necessary to mate the scintillator screen and the flat panel detector in a manner that does not degrade antistatic protection or hinder detection of the visible radiation by the flat panel detector.

SUMMARY

According to an embodiment, there is described a scintillator screen that includes a supporting layer having a phosphor dispersed in a polymeric binder disposed on the supporting layer and a barrier layer disposed on the polymeric binder. The barrier layer includes a non-moisture absorbing polymer selected from the group consisting of polyethylene terephthalate, cellulose diacetate, ethylene vinyl acetate and polyvinyl butyraldehyde. The barrier layer has a thickness of less than 1 micron. An antistatic layer is disposed on the barrier layer. The antistatic layer includes poly (3,4-ethylenedixythiophene)-poly(styrene sulfonate) dispersed in a polymer selected from the group consisting of a polyester and a polyurethane. The antistatic layer has a transparency of greater than about 95 percent at a wavelength of from about 400 nm to 600 nm.

According to another embodiment there is provided a digital radiography panel including a scintillator screen having a supporting layer, a phosphor dispersed in a polymeric binder disposed on the supporting layer, a barrier layer disposed on the polymeric layer and an antistatic layer disposed on barrier layer. The barrier layer includes a non-moisture absorbing polymer selected from the group consisting of polyethylene terephthalate, cellulose diacetate, ethylene vinyl acetate and polyvinyl butyraldehyde. The antistatic layer includes a poly(3,4-ethylenedixythiophene)-poly(styrene sulfonate) dispersed in a polymer selected from the group consisting of a polyester and a polyurethane. The antistatic layer has a transparency of greater than 95 percent at a wavelength of from about 400 nm to 600 nm. A flat panel detector is disposed on the antistatic layer.

There is provided a scintillator screen that includes a supporting layer, a phosphor dispersed in a polymeric binder disposed on the supporting layer, a barrier layer disposed on the polymeric binder comprising a non-moisture absorbing polymer; and an antistatic layer disposed on the barrier layer. The antistatic layer includes poly(3,4-ethylenedixythiophene)-poly(styrene sulfonate) dispersed in a polymer selected from the group consisting of a polyester and a polyurethane. The antistatic layer has a transparency of greater than 95 percent at a wavelength of from about 400 nm to 800 nm. The antistatic layer has thickness of from about 0.1 μm to about 0.3 μm.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 1 is a schematic illustration of a digital radiographic detector.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The issue of minimizing ESD events is important in many areas of industrial and consumer importance, including the photography. ESD events have been recognized as a primary cause for the accumulation of charge on film or paper surfaces, which lead to the attraction of dirt and visible physical defects.

It is recognized that that the triboelectric charge can be dissipated effectively by incorporating one or more electrically-conductive "antistatic" layers in photographic films. Many approaches of using antistatic layers on one or to both sides of the support (photographic film or paper base) or as subbing layers either beneath or on the side opposite to the light-sensitive silver halide emulsion layers have been utilized. In some industries, such as the packaging industry, the antistatic agent is incorporated into the photographic film base itself. U.S. Pat. No. 6,346,370 describes the use of antistatic layers in photographic films.

A wide variety of electrically-conductive materials, with a wide range of conductivities are available for use in these photographic antistatic layers. The materials are generally categorized as (i) ionic conductors and (ii) electronic conductors. In ionic conductors (such as simple inorganic salts, alkali metal salts of surfactants, ionic conductive polymers, polymeric electrolytes containing alkali metal salts, or colloidal metal oxide sols) charge is transferred by the bulk diffusion of charged species through an electrolyte. The drawback of these ionic conductors is that their resistivity is dependent on temperature and humidity, and many of these materials are water-soluble and would leach out of if the moisture level too high, resulting in a loss of antistatic function. Also, the conductivity of ionic conductors is not very high, and is suitable for antistatic dissipation applications, where the magnitude of charge that needs to dissipate is not high, and the time constant for dissipation does not have to be very short.

The conductivity of antistatic layers of electronic conductors depends on electron mobility (contain conjugated polymers, semiconductive metal halide salts, semiconductive metal oxide particles, etc.) rather than ionic mobility and is independent of humidity. The conductivity of these materials can be very high, and is suitable for antistatic dissipation applications, where the magnitude of the charge to be dissipated is high and the time constant for dissipation needs to be short. However, these materials tend to be difficult to formulate and coat and often impart unfavorable physical characteristics, such as color, increased brittleness and poor adhesion, etc.

Within the antistatic patent literature for photographic applications, it is seen that some of the antistatic layers alleviate some problems but may aggravate some others. For example, U.S. Pat. No. 3,525,621 teaches how to impart antistatic performance to an aqueous coating composition using silica particles, in combination with an alkylaryl polyether sulfonate, but the high solubility of the alkylaryl polyether sulfonate in an aqueous medium causes leaching of other materials in the coating during processing. U.S. Pat. No. 5,244,728 teaches a binder polymer including an addition product of alkyl methacrylate, alkali metal salt and vinyl benzene which, when incorporated in an antistatic layer for photographic paper, provides solution to the above problem of backmark retention, but introduces spliceability issues. U.S. Pat. Nos. 5,683,862 and 5,466,536 teach of the use of a mixture of polymers and copolymers for good printabilty, but this formulation mixture compromises the stability of the antistatic layer. Further, the adhesion of the antistatic (or any other) layer to a surface is influenced by the surface characteristics, as well as the formulation, as evidenced in U.S. Pat. No. 4,547,445, which discloses a layer containing gelatin and an inorganic pigment for improved ink-retaining characteristics, and good adhesion to polyethylene-coated photographic paper, but which does not exhibit good adhesion to biaxially oriented polypropylene-coated photographic paper. Antistatic protection in photographic applications is not transferrable to digital radiography because the problems associated with ESD events in digital radiographic detectors are unique, and require inventive solutions, that resolve these problems, without introducing additional problems.

Disclosed herein is a layer structure and a method of manufacturing a digital radiography (DR) panel that minimizes the magnitude of the charge generated by any stray ESD event. Certain attributes are required for an antistatic layer structure suitable for use in a DR panel. The antistatic layer structure must be transparent to radiation in the 400-600 nm wavelength region of the electromagnetic spectrum. The antistatic layer is coated on the surface of a scintillator screen. The surface resistivity of the antistatic layer must be less than about $10^5$ ohms per square. In addition, the scintillator screen and the flat panel detector must be mated in a manner that does not degrade the antistatic protection or interfere with the detection of visible light by the flat panel detector.

FIG. 1 shows a sectional view of component layers of a digital radiography (DR) panel 10. Scintillator screen 12 has a scintillator layer 14 formed on a support 11 that is highly transmissive to incident x-ray radiation. Flat panel detector (FPD) 20 detects visible radiation. Interposed between the scintillator screen 12 and the FPD 20 is an adhesive layer 17 provided to bind or mate the scintillator screen 12 to the FPD 20. In embodiments, the scintillator screen 12 includes a barrier layer 18 and an antistatic layer 19. Scintillator layer 14 responds to incident x-ray R by emitting photons toward FPD 20.

Support 11 can be made of borosilicate glass, aluminosilicate glass, fusion-formed glass, metal, or plastic, or combinations thereof.

The scintillating screen 12 is responsive to the X-rays passing through an object to produce light which illuminates the FPD to provide signals representing an X-ray image. The scintillating screen 12 includes a layer 14 of a prompt emitting phosphor dispersed as a particulate in a polymeric matrix. Suitable prompt emitting phosphors are well known, for example, rare-earth oxysulfides doped with a rare-earth activator. The present invention preferably uses emitting phosphors such as $Gd_2O_2S$:Tb, $Gd_2O_2S$:Eu, $Gd_2O_3$:Eu, $La_2O_2S$:Tb, $La_2O_2S$, $Y_2O_2S$:Tb, CsI:Tl, CsI:Na, CsBr:Tl, NAI:Tl, $CaWO_4$, $CaWO_4$:Tb, $BaFBr$:Eu, $BaFCl$:Eu, $BaSO_4$:Eu, $BaSrSO_4$, $BaPbSO_4$, $BaAl_{12}O_{19}$:Mn, $BaMgAl_{10}O_{17}$:Eu, $Zn_2SiO_4$:Mn, (Zn,Cd)S:Ag, LaOBr, LaOBr:Tm, $Lu_2O_2S$:Eu, $Lu_2O_2S$:Tb, $LuTaO_4$, $HfO_2$:Ti, $HfGeO_4$:Ti, $YTaO_4$, $YTaO_4$:Gd, $YTaO_4$:Nb, $Y_2O_3$:Eu, $YBO_3$:Eu, $YBO_3$:Tb, and $(Y,Gd)BO_3$:Eu, or combinations thereof. In embodiments gadolinium oxy sulfides $Gd_2O_2S$:Tb, $Gd_2O_2S$:Eu, $Gd_2O_3$:Eu are preferred. However, any suitable prompt emitting phosphor material, including doped phosphor materials, can be used in any of the embodiments described herein. A blend of different phosphors can also be used. The median particle size of the phosphor particle is generally between about 0.5 μm and about 40 μm. A median particle size of between 1 μm and about 20 μm is preferred for ease of formulation, as well as optimizing properties, such as speed, sharpness and noise.

The phosphor layer 14 can be prepared using conventional coating techniques, where the phosphor powder is mixed with a solution of a resin binder material and coated onto a support 11. The binder can be chosen from a variety of known organic polymers that are transparent to X-rays, stimulating, and emitting light. Polymeric binders commonly employed in the art include sodium o-sulfobenzaldehyde acetal of poly(vinyl alcohol); chloro-sulfonated poly (ethylene); a mixture of macromolecular bisphenol poly (carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly (urethane) elastomers. However, any conventional ratio phosphor to binder can be employed. Generally, thinner phosphor layers and sharper images are realized when a high weight ratio of phosphor to binder is employed. Phosphor-to-binder ratios are in the range of about 7:1 to about 35:1. In embodiments, the phosphor-to-binder ratio is from about 7:1 to about 25:1.

Scintillator screens are prepared by coating a scintillator solution on the support 11 to form the scintillator layer 14. The scintillator solution can be applied using any conventional coating techniques known in the art. For example, the scintillator solution can be applied onto the support 11 by spray coating, dip-coating, doctor blade coating, roll coating, knife coating, or slot die coating. Suitable manufacturing techniques are described, for example, in U.S. Pat. No. 7,304,317, which is herein incorporated by reference in its entirety.

In order to provide suitable antistatic protection it is necessary to provide a barrier layer 18 on the scintillator screen 12. The barrier layer 18 must not absorb moisture. In addition, the barrier layer cannot be water soluble. The barrier layer comprises one or more non-moisture absorbing polymer binders selected from the group consisting of polyethylene terephthalate (PET), cellulose diacetate (CDA), ethylene vinyl acetate (EVA) and polyvinyl butyraldehyde (BUTVAR). The barrier layer has a thickness of from about 1 μm and about 10 μm. The barrier layer 18 can extend over and be used to seal the edges of the phosphor layer 14 to the support 11. The barrier layer is disposed directly on the phosphor layer. The barrier layer 18 is coated from a solvent solution. The barrier layer materials can be applied using the same slot coating techniques as used with the phosphor layer 14. The barrier layer solution or dispersion can be applied onto the phosphor layer 14 by spray coating, dip-coating, doctor blade coating, roll coating, knife coating, or slot die coating. The barrier layer has a transparency of greater than 95 percent at a wavelength of from about 400 nm to 600 nm.

In embodiments, when polyethylene terephthalate (PET) is used as the barrier layer, the preferred thickness range is from about 2 μm to about 10 μm. In embodiments, when cellulose diacetate (CDA) is used as the barrier layer, the preferred thickness range is about 1 μm to about 5 μm. In embodiments, when ethylene vinyl acetate (EVA) is used as the barrier layer, the preferred thickness range is about 2 μm to about 10 μm. In embodiments, when polyvinyl butyraldehyde (BUTVAR) is used as the barrier layer, the preferred thickness range is about 2 μm to about 10 μm.

The antistatic layer 19 is disposed on the barrier layer 18. The antistatic layer comprises poly(3,4-ethylenedixythiophene)-poly(styrene sulfonate) (available from Heraeus Company as PEDOT/PSS) dispersed in a polymer selected from the group consisting of a polyester and a polyurethane. Poly(3,4-ethylenedixythiophene)-poly(styrene sulfonate) is a conductive polymer that is transmissive in the wavelength region of 400 nm to 600 nm. The antistatic layer has a transparency of greater than 95 percent at a wavelength of from about 400 nm to 600 nm. In embodiments, the transparency is greater than 94 percent at a wavelength of from about 400 nm to 600 nm. The layer thickness of the dried antistatic layer is from about 0.1 μm to about 0.3 μm. The coverage of the poly(3,4-ethylenedixythiophene)-poly(styrene sulfonate) is from about 0.1 micrograms/cm$^2$ to about 0.5 micrograms/cm$^2$. The ratio of polymer to poly(3,4-ethylenedixythiophene)-poly(styrene sulfonate) from about 0.5 to about 1.5. The surface resistivity is less than $10^{10}$ ohms per square. This is the maximum value that the surface resistivity can be and still protect the DR panel 10 against ESD events. In embodiments, the surface resistivity is less than $10^8$ ohms per square, or $10^5$ ohms per square The antistatic layers can be coated by any suitable method including spray coating, dip-coating, doctor blade coating, roll coating, knife coating, slot die coating or spin coating. Spin coating is a procedure used to apply uniform thin films to flat substrates. An excess amount of a solution is placed on the substrate, which is then rotated at high speed in order to spread the solution by centrifugal force. Rotation is continued while the fluid spins off the edges of the substrate, until the desired thickness of the film is achieved. The higher the angular speed of spinning, the thinner the film. The thickness of the film also depends on the concentration of the solution and the solvent.

Drying of any of the layers (phosphor layer 14, barrier layer 18 or antistatic layer 19) described can be achieved by a number of different techniques; including, room temperature evaporation, hot plates, ovens, UV, or IR exposure. The drying technique is typically formulation specific, depending on solvents used and the presence of other addenda. For example: coating solutions that utilize volatile solvents (low boiling temperature solvents) can be dried through low temperature solvent evaporation. While coatings that utilize non-volatile solvents (high boiling temperature solvents)

may require the use of elevated temperature or any of the other above mentioned techniques to accelerate the solvent evaporation process.

The Flat Panel Detector (FPD) 20, also referred to as a detector array, may include a PIN diode as photosensor. Multiple photosensors are used to detect the radiation emitted from the scintillating phosphors and form a photosensor array. The FPD 20 can include various layers such as a p-doped layer, an I-layer (intrinsic or undoped layer), and an n-doped layer formed on a metal layer which is itself supported by a substrate, typically glass such as Corning 1737 display glass. A transparent ITO (Indium-Tin Oxide) layer provides conductive traces. A passivation layer adds insulation and surface uniformity. The scintillator screen 12 is maintained in physical contact between scintillator screen 12 and FPD 20 through an optical adhesive. It is important that physical contact be maintained across the entire active area of the FPD 20, so that uniform and efficient transfer of the converted visible light is achieved. The glass of the FPD 20 is typically 0.7 mm thick, and susceptible to breakage, especially for a large-area, such as 43 cm by 43 cm panels. In embodiments, FPD 20 can include CMOS and CCD as part of the photosensor array.

Phosphor layer 14 responds to incident x-ray radiation by emitting photons toward FPD 20. As long as there is good optical coupling between scintillator screen 12 and FPD 20, a sufficient amount of the emitted signal is directed toward FPD 20.

An adhesive layer 17 mates the scintillator screen 12 and FPD 20. The dimensional requirements of the FPD 20 panel may be as large as 43 cm by 43 cm (1865 square centimeters). This requires a uniform adhesive layer 17 that contains no gaps, voids or bubbles and has a constant thickness. Where an air gap occurs, the light transmission and the spatial resolution are significantly degraded.

The adhesive layer 17 must be stable and not impact the optical properties or antistatic properties of the FPD 20. The adhesive layer 17 must provide some dimensional rigidity; however, it must not be so rigid that it distorts the FPD 20. The adhesive layer 17 must be uniform and without voids.

While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature may be combined with one or more other features of the other implementations as may be desired and advantageous for any given or particular function.

EXAMPLES

Scintillator Screens

CSH Scintillator Screen (representative of scintillator screen surface without an overcoat that serves as a barrier layer for subsequent coatings (elements 11 and 14 in FIG. 1)): A drum of SU-21-572 Permuthane dispersed in solvent from Stahl USA was coated onto a PET substrate and the solvent was flashed off. The dried permuthane is then placed into a mixture of an approximate mixture of Dichloromethane and Methanol (93:7) at an approximate ratio of 12.5:87.5 for an approximately 2 weeks to allow the permuthane to fully dissolve. The fully dissolved permuthane is placed into a 9 gallon pressurized vessel and an air driven lightening mixer with an impeller is used to make a homogeneous solution. To this permuthane mixture, GOS 3010-03 from Nichia Corp. was added together at a ratio of 77:23 (GOS: permuthane) and allowed to mix using the air driven lightening mixer with an impeller. GOS is a gadolinium oxy sulfide of the formula $Gd_2O_2S:Tb$. The resulting slurry is coated on a 10 mil polyester support, using the slot coater, and transported through a series of air dryers with a temperature range between about 35° C. to about 46° C. for approximately 8 minutes.

Scintillator coatings for the following examples were prepared using a lab-scale slot coater. The barrier layer materials (CDA, EVA, BUTVAR) polyvinyl acetate (PVAc), polyvinyl alcohol (PVOH) and gelatin were applied using the same slot coating techniques, but over the dried scintillator layer. The antistatic layers were coated using a lab scale spin coater (Laurell Spin Coater Model WS-650).

The coating solutions utilized in the generation of the inventive and comparative examples were solvent-based solutions, therefore, drying was primarily performed by thermal and/or evaporative techniques. In the case of drying or curing, the temperature was above room temperature, and an inert gas environment was utilized if necessary through use of an inert gas oven. In addition, the air flow around the coated layer was laminar.

Solution ingredients were mixed in a controlled manner, and agitated using standard mixing methods (e.g., prop mixing, magnetic bar, sonicator, or roller mill) for a specified amount of time. Then, the stability of the dispersion observed visually, using a light source behind a clear container and observing if there is the noticeable presence of agglomerations or settling of materials to the bottom of the container.

DRZ+ screen (representative of scintillator screen surface with a PET overcoat that serves as a barrier layer for subsequent coatings): Mitsubishi provides three levels of scintillator screens that utilize prompt emitting phosphors, DRZ-Std, DRZ-Plus and DRZ-High. All three screens have a common product structure; a supporting layer, a phosphor layer and a protective layer. The supporting layer is a "plastic base" that can range from 188 μm to 250 μm; the DRZ+ scintillator has a 250 μm base thickness. The phosphor layer is comprised of a proprietary phosphor and binder formulation that ranges in thickness from 140 μm to 310 μm; the DRZ+ scintillator has a 208 μm phosphor layer thickness. The protective layer is a polyethylene (PET) sheet that covers the phosphor layer and ranges in thickness from 6 μm to 9 μm.

Optical Measurements

Visual transmittance was measured using a Perkin Elmer Lambda 3B UV/Vis Spectrophotometer. This system was used to measure both dispersions and coated samples.

Surface Resistivity

The measurement of surface resistivity of the coated samples was conducted in accordance to American Society for Testing and Materials (ASTM) standard D257-07. Resistivity measurement equipment from Prostat Corporation was utilized for all testing. The resistivity measurement kit included the PRS-801 Resistivity meter, PRF-911 Concentric Ring Set (which included the required test leads and connectors), PTB-920 Dual Test Bed and the PRS-801-W 5 lb. weight. The instrument was calibrated before each use using a shunt that was provided by the manufacturer.

Charge Decay Measurement

The measurement of charge decay was conducted in accordance with the general practices outlined in FTM Standard 101C, method 4046.1. Measurement equipment from Prostat Corporation was utilized for all testing. The equipment utilized included: the PFM-711A Electrostatic Field Meter, the CPM-720A Charge Plate Assembly, Conductive Probes, the PGA-710 Autoanalysis System, the PCS-730 Charging Source and associated connecting cables. All instruments were calibrated at the factory. The PFM-711A Field meter has a zero balance, this was adjusted and verified to be zero before each test.

Clean Room Wiping Protocol

A clean room towel is wetted with isopropyl alcohol (IPA). The towel was then used to wipe the antistatic layer coated scintillator screen. A constant and repeatable wiping normal force is generated by wrapping the towel around a 1 kilogram cylindrical weight, that is about 38 mm diameter. The weight/towel is placed on an 83 mm wide scintillator and is dragged across the surface of the screen. This process is repeated 3 times—each time using a different portion of the towel. The ability to withstand abrasion from clean room wiping is demonstrated by the Wipe test. The scintillator screen must be abrasion resistant to maintain ESD protection.

The experiments described below show the need for a non-moisture absorbing and non-water soluble barrier layer over a scintillator layer having a prompt emitting phosphor dispersed in a polymeric binder. Without the barrier layer, the antistatic layer does not provide the proper level of conductivity due to the porous nature of the scintillator layer 14. The antistatic material has a propensity to diffuse into the scintillator layer 14, distorting the conductivity network, and thus increasing the surface resistivity. In order to reduce the surface resistivity under these circumstances, it is necessary to either saturate the concentration of the antistatic material that diffuses into the scintillator layer 14, which would require a significant increase in the concentration while reducing transparency of the scintillator layer 14, or introduce a barrier layer 18 between the scintillator layer 14 and the antistatic layer 19. The barrier layer 18 prevents diffusion of the antistatic material into the scintillator layer 14, while maintaining the transparency requirements.

The active ingredient in the antistatic layer formulation of an aqueous dispersion of Clevios Pedot (PEDOT/PSS) available from Heraeus Company. The antistatic species in PEDOT/PSS is poly(3,4-ethylenedixythiophene)-poly(styrene sulfonate). The addenda of the antistatic formulations are outlined in the Table 1 below.

TABLE 1

| Ingredient | Wt % |
|---|---|
| 1X Binder Formulation | |
| Water | 79.96 |
| Clevios PH 1000 | 7.69 |
| AQ55D | 4.95 |
| Dynol | 2.4 |
| Ethylene Glycol | 5 |
| 2X Binder Formulation | |
| Water | 74.25 |
| Clevios PH 1000 | 14.29 |
| AQ55D | 4.60 |
| Dynol | 2.23 |
| Ethylene Glycol | 4.63 |
| 4X Binder Formulation | |
| Water | 64.97 |
| Clevios PH 1000 | 25 |
| AQ55D | 4.02 |
| Dynol | 1.95 |
| Ethylene Glycol | 4.06 |
| 8X Binder Formulation | |
| Water | 51.97 |
| Clevios PH 1000 | 40 |
| AQ55D | 3.22 |

TABLE 1-continued

| Ingredient | Wt % |
|---|---|
| Dynol | 1.56 |
| Ethylene Glycol | 3.25 |

The Eastman AQ55 addenda was dispersed in distilled water, heated to 70° C. and stirred for a minimum of 2 hours until it was completely dissolved and homogeneous. Once the AQ55 solution is complete, the antistatic layer formulation is measured in the ratios provided in the above table. Dynol 604 from Air Products and Chemicals, Allentown, Pa. is used as a coating aid. Ethylene Glycol is added to the mixture to act as a conductivity enhancer. The solution is mixed by any number of techniques including the use of a roller mill, and spin coated.

Comparative Example 1

The antistatic formulations shown described above were coated on the CSH Scintillator Screen described above. The surface resistivity and percent transmittance in the 400-600 nm range are shown in Table 2 below.

Comparative Example 2

A gelatin coating was coated on the CSH Scintillator Screen. A gelatin overcoat layer was prepared as follows. 144.5 grams of Gel 34, a lime processed ossein was dissolved into 1760.5 grams of distilled water for 120 minutes. This mixture was heated up to 50° C. and held for 20 minutes. After 20 minutes, the temperature is lowered to 40° C. and a prop mixer was inserted into the container. The mixer was turned on for 10 minutes and a surfactant package was added to the mixture. This mixture was slot die coated on top of the scintillator screen at a wet thickness of 0.005". After the overcoat solution was applied, it was dried in place with a platen temperature of 50° C. for 20 minutes.

The antistatic formulations shown in Table 1 were coated on the CSH Scintillator Screen with the gelatin overcoat. The surface resistivity and percent transmittance in the 400-600 nm range are shown in Table 2 below.

Comparative Example 3

A polyvinyl alcohol coating was coated on the CSH Scintillator Screen as a barrier layer. 20 g of Sigma Aldrich Poly(vinyl alcohol, MW 89,000-98,000 was weighed out and mixed with 360 g of Distilled Water and mixed using a prop mixer for 2 hours at 88° C. This mixture was slot die coated on top of the scintillator screen at a wet thickness of 0.005". After the overcoat solution was applied, it was dried in place with the platen temperature of 40° C. for 20 minutes. The antistatic formulations shown described in Table 1 were coated on the CSH screen with the polyvinyl alcohol overcoat. The surface resistivity and percent transmittance in the 400-600 nm range are shown in Table 2 below.

Inventive Example 1

The antistatic formulations shown and identified in Table 1 above were coated on the DRZ+ screen. The surface resistivity and percent transmittance in the 400-600 nm range are shown in Table 2 below.

Inventive Example 2

An ethylene vinyl acetate (EVA) coating was coated on the CSH Scintillator Screen as a barrier layer. 5 grams of DuPont™ Elvax 150 is an ethylene vinyl acetate copolymer resin was weighed out and mixed with 95 grams of Toluene and roller milled for 24 hours. This mixture was slot die coated on top of the scintillator screen described at a wet thickness of 0.005". After the solution was applied, it was dried in place with the platen temperature of 40° C. for 20 minutes. The antistatic formulations shown in Table 1 were coated on the CSH Scintillator Screen with the EVA overcoat. The surface resistivity and percent transmittance in the 400-600 nm range are shown in Table 2 below.

Inventive Example 3

A cellulose diacetate (CDA) coating was coated on the CSH Scintillator Screen as a barrier layer. 2 grams of the Eastman™ Cellulose Acetate (CA-398-3) was weighed out and mixed with 98 grams of NitroMethane and roller milled for 2 hours. This mixture was slot die coated on top of the CSH Scintillator Screen at a wet thickness of 0.005". After the overcoat solution was applied, it was dried with the platen temperature of 40° C. for 20 minutes. The antistatic formulations shown in Table 1 were coated on the CSH Scintillator Screen with the EVA overcoat. The surface resistivity and percent transmittance in the 400-600 nm range are shown in Table 2 below.

Inventive Example 4

A polyvinyl butyraldehyde (Butvar) coating was coated on the CSH Scintillator Screen as a barrier layer. 5 grams of Butvar® 76 (Polyvinyl butyral resin) was weighed out and mixed with 95 grams of Acetone and roller milled for 24 hours. This mixture was slot die coated on top of the CSH Scintillator Screen at a wet thickness of 0.005". After the overcoat solution was applied, it was dried with the platen temperature of 12° C. for 20 minutes. The antistatic formulations shown in Table 1 were coated on the CSH Scintillator Screen with the EVA overcoat. The surface resistivity and percent transmittance in the 400-600 nm range are shown in Table 2 below.

In the results shown in Table 2, the goal was to find an antistatic layer that provided excellent surface resistivity and transmission. The goal was to have surface resistivity under $10^5$ ohms per square. Previous tests with poly (3,4-ethylene dioxythiophene) as an antistatic agent showed surface resistivities that were not acceptable. Zelec® electroconductive powders were tested and provided acceptable surface resistivity, however, the transmission in the 400 nm to 600 nm wavelength was unacceptable. As the scintillator screen 12 is mated with a FPD 20, there can be an insulating effect caused by the adhesive layer. In order to overcome this effect it is necessary in the tests above to be well under $10^{10}$ ohms per square so the DR panel will have protection from ESD events. A highly conductive antistatic agent allows for thinner coating layers.

Other embodiments of the present teachings will be apparent to those skilled in the art from consideration of the specification and practice of the present teachings disclosed herein. In addition, while a particular feature of the invention can have been disclosed with respect to only one of several implementations, such feature can be combined with one or more other features of the other implementations as can be desired and advantageous for any given or particular function. The term "about" indicates that the value listed can be somewhat altered, as long as the alteration does not result in nonconformance of the process or structure to the illustrated embodiment. Further, "exemplary" indicates the description is used as an example, rather than implying that it is an ideal. It is intended that the specification and examples be considered as exemplary only, with the true scope and spirit of the present teachings being indicated by the following claims.

TABLE 2

| Sample | Coating surface | Antistat Coating Formulation | Minimum transmittance in the 400-800 nm range (measured by coating the antistat formulation on a glass substrate) | Surface Resistivity ($\Omega/\square$) | Coating Meets Minimum Resistivity Specification <1.0 E5 $\Omega/\square$ & Minimum Transmission Requirement |
|---|---|---|---|---|---|
| Comparative Example 1 | a film of GOS in permuthane | 1X | 95% | 1.35E+06 | No - Fail Resistivity |
| | | 2X | 94% | 3.84E+06 | No - Fail Resistivity |
| | | 4X | 92% | 3.50E+04 | No - Fail Transmission |
| | | 8X | 88% | 1.05E+04 | No - Fail Transmission |
| Comparative Example 2 | a thin film of gelatin coated over a film of GOS in permuthane | 1X | 95% | 2.00E+11 | No - Fail Resistivity |
| | | 2X | 94% | 9.65E+09 | No - Fail Resistivity |
| | | 4X | 92% | 2.20E+09 | No - Fail Resistivity & transmission |
| | | 8X | 88% | 3.55E+08 | No - Fail Resistivity & transmission |
| Comparative Example 2 | a thin film of polyvinyl alcohol coated over a film of GOS in permuthane | 1X | 95% | 8.83E+08 | No - Fail Resistivity |
| | | 2X | 94% | 4.75E+08 | No - Fail Resistivity |
| | | 4X | 92% | 1.47E+08 | No - Fail Resistivity & transmission |
| | | 8X | 88% | 1.87E+06 | No - Fail Resistivity & transmission |
| Inventive Example 1 | a thin film of PET coated over a film of GOS in permuthane layer | 1X | 95% | 5.65E+07 | No - Fail Resistivity |
| | | 2X | 94% | 2.95E+04 | Yes |
| | | 4X | 92% | 2.45E+04 | No - Fail Transmission |
| | | 8X | 88% | 9.00E+06 | No - Fail Transmission |
| Inventive Example 2 | a thin film of CDA coated over a film of GOS in permuthane layer | 1X | 95% | 7.35E+07 | No - Fail Resistivity |
| | | 2X | 94% | 1.80E+04 | Yes |
| | | 4X | 92% | 1.05E+04 | No - Fail Transmission |
| | | 8X | 88% | 8.80E+03 | No - Fail Transmission |
| Inventive Example 3 | a thin film of EVA coated over a film of GOS in permuthane layer | 1X | 95% | 2.35E+06 | No - Fail Resistivity |
| | | 2X | 94% | 6.86E+04 | Yes |
| | | 4X | 92% | 1.50E+04 | No - Fail Transmission |
| | | 8X | 86% | 3.90E+06 | No - Fail Transmission |

TABLE 2-continued

| Sample | Coating surface | Antistat Coating Formulation | Minimum transmittance in the 400-800 nm range (measured by coating the antistat formulation on a glass substrate) | Surface Resistivity ($\Omega/\square$) | Coating Meets Minimum Resistivity Specification <1.0 E5 $\Omega/\square$ & Minimum Transmission Requirement |
|---|---|---|---|---|---|
| Inventive Example 4 | a thin film of Eulvar coated over a film of GOS in permuthane layer | 1X | 96% | 5.50E+07 | No - Fail Resistivity |
| | | 2X | 94% | 6.70E+04 | Yes |
| | | 4X | 92% | 2.20E+04 | No - Fail Transmission |
| | | 8X | 88% | 8.50E+03 | No - Fail Transmission |

What is claimed is:

1. A scintillator screen comprising:
a support layer;
a scintillator layer directly disposed on the support layer, the scintillator layer comprised of a phosphor dispersed in a polymeric binder;
a barrier layer disposed on the scintillator layer, the barrier layer comprising a non-moisture absorbing polymer selected from the group consisting of polyethylene terephthalate, cellulose diacetate, ethylene vinyl acetate and polyvinyl butyraldehyde, wherein the barrier layer has a thickness of less than 1 micron; and
an antistatic layer having an inner surface and an outer surface, the inner surface of the antistatic layer being disposed on the barrier layer, the antistatic layer comprising a poly(3,4-ethylenedixythiophene)-poly(styrene sulfonate) dispersed in a polymer selected from the group consisting of a polyester and a polyurethane;
wherein a transparency of the combination antistatic and barrier layers together is greater than 95 percent at a wavelength of from about 400 nm to 600 nm; and
wherein a surface resistivity of the scintillator screen at the outer surface of the antistatic layer is less than $10^{10}$ ohms/square.

2. The screen of claim 1, wherein the barrier layer has a transparency of greater than 94 percent at a wavelength of from about 400 nm to 600 nm.

3. The screen of claim 1, wherein the antistatic layer has a transparency of greater than 94 percent at a wavelength of from about 400 nm to 600 nm.

4. The screen of claim 1, wherein the phosphor is selected from the group consisting of $Gd_2O_2S$:Tb, $Gd_2O_2S$:Eu, $Gd_2O_3$:Eu, $La_2O_2S$:Tb, $La_2O_2S$, $Y_2O_2S$:Tb, CsI:Tl, CsI:Na, CsBr:Tl, $CaWO_4$, $CaWO_4$:Tb, BaFBr:Eu, BaFCl:Eu, $BaSO_4$:Eu, $BaSrSO_4$, $BaPbSO_4$, $BaAl_{12}O_{19}$:Mn, $BaMgAl_{10}O_{17}$:Eu, $Zn_2SiO_4$:Mn, (Zn,Cd)S:Ag, LaOBr, LaOBr:Tm, $Lu_2O_2S$:Eu, $Lu_2O_2S$:Tb, $LuTaO_4$, $HfO_2$:Ti, $HfGeO_4$:Ti, $YTaO_4$, $YTaO_4$:Gd, $YTaO_4$:Nb, $Y_2O_3$:Eu, $YBO_3$:Eu, $YBO_3$:Tb, and $(Y,Gd)BO_3$:Eu.

5. The screen of claim 1, wherein the polymeric binder is selected from the group consisting of: sodium o-sulfobenzaldehyde acetal of poly(vinyl alcohol); chloro-sulfonated poly(ethylene); bisphenol poly(carbonates);
copolymers of bisphenol carbonates and poly(alkylene oxides); aqueous ethanol soluble nylons; poly(alkyl acrylates and methacrylates): copolymers of poly(alkyl acrylates and methacrylates); poly(vinyl butyral) and poly(urethane) elastomers.

6. The screen of claim 1, wherein the phosphor comprises particles having a size of from about 0.5 µm to about 40 µm, wherein a phosphor to polymeric binder ratio is from about 7:1 to about 35:1.

7. The screen of claim 1, wherein the antistatic layer has thickness of from about 0.1 µm to about 0.3 µm.

8. A digital radiography panel comprising:
a scintillator screen comprising:
 (a) a support layer;
 (b) a phosphor layer comprised of a scintillator dispersed in a polymeric binder, and directly disposed on the support layer;
 (c) a non-phosphor layer having a transparency of greater than 95 percent at a wavelength of from about 400 nm to 600 nm, and comprised of:
  (i) a barrier layer disposed on the phosphor layer comprising a non-moisture absorbing polymer selected from the group consisting of polyethylene terephthalate, cellulose diacetate, ethylene vinyl acetate and polyvinyl butyraldehyde; and
  (ii) an antistatic layer having an inner surface and an outer surface, the inner surface of the antistatic layer being disposed on the barrier layer, the antistatic layer comprising a poly(3,4-ethylenedixythiophene)-poly(styrene sulfonate) dispersed in a polymer selected from the group consisting of a polyester and a polyurethane, wherein a surface resistivity of the scintillator screen at the outer surface of the antistatic layer is less than $10^{10}$ ohms/square; and
a flat panel detector disposed on the outer surface of the antistatic layer.

9. The panel of claim 8, wherein the barrier layer has a transparency of greater than 95 percent at a wavelength of from about 400 nm to 600 nm.

10. The panel of claim 8, wherein the antistatic layer has a transparency of greater than 94 percent at a wavelength of from about 400 nm to 600 nm.

11. The panel of claim 8, wherein the antistatic layer has a surface resistivity less than $10^5$ ohms/square.

12. The panel of claim 8, wherein the phosphor is selected from the group consisting of $Gd_2O_2S$:Tb, $Gd_2O_2S$:Eu, $Gd_2O_3$:Eu, $La_2O_2S$:Tb, $La_2O_2S$, $Y_2O_2S$:Tb, CsI:Tl, CsI:Na, CsBr:Tl, NaI:Tl, $CaWO_4$, $CaWO_4$:Tb, BaFBr:Eu, BaFCl:Eu, $BaSO_4$:Eu, $BaSrSO_4$, $BaPbSO_4$, $BaAl_{12}O_{19}$:Mn, $BaMgAl_{10}O_{17}$:Eu, $Zn_2SiO_4$:Mn, (Zn,Cd)S:Ag, LaOBr, LaOBr:Tm, $Lu_2O_2S$:Eu, $Lu_2O_2S$:Tb, $LuTaO_4$, $HfO_2$:Ti, $HfGeO_4$:Ti, $YTaO_4$, $YTaO_4$:Gd, $YTaO_4$:Nb, $Y_2O_3$:Eu, $YBO_3$:Eu, $YBO_3$:Tb, and $(Y,Gd)BO_3$:Eu, and wherein the polymeric binder is selected from the group consisting of: sodium o-sulfobenzaldehyde acetal of poly(vinyl alcohol);
chloro-sulfonated poly(ethylene); bisphenol poly(carbonates); copolymers of bisphenol carbonates and poly(alkylene oxides); aqueous ethanol soluble nylons;
poly(alkyl acrylates and methacrylates): copolymers of poly(alkyl acrylates and methacrylates); poly(vinyl butyral) and poly(urethane) elastomers.

13. The panel of claim 8, further comprising an adhesive layer disposed between the antistatic layer and the flat panel detector.

14. The panel of claim 8, wherein:

the barrier layer has a thickness of less than 1 micron;

the scintillator comprises particles having a size of from about 0.5 μm to about 40 μm; and the antistatic layer has thickness of from about 0.1 μm to about 0.3 μm.

15. A scintillator screen comprising:

a support layer;

a phosphor layer comprised of a phosphor dispersed in a polymeric binder, and directly disposed on the support layer, a barrier layer disposed on the phosphor layer and comprising a non-moisture absorbing polymer; and an antistatic layer having an inner surface and an outer surface, the inner surface of the antistatic layer being disposed on the barrier layer, the antistatic layer comprising a poly(3,4-ethylenedixythiophene)-poly(styrene sulfonate) dispersed in a polymer selected from the group consisting of a polyester and a polyurethane;

wherein the antistatic layer and the barrier layer together have a combined transparency of greater than 95 percent at a wavelength of from about 400 nm to 600 nm; and wherein a surface resistivity of the scintillator screen at the outer surface of the antistatic layer is less than $10^{10}$ ohms/square.

16. The screen of claim 15, wherein:

the barrier layer has a thickness of less than 1 micron;

the phosphor layer comprises particles having a size of from about 0.5 μm to about 40 μm;

a phosphor to polymeric binder ratio is from about 7:1 to about 35:1; and the antistatic layer has thickness of from about 0.1 μm to about 0.3 μm.

* * * * *

UNITED STATES PATENT AND TRADEMARK OFFICE
CERTIFICATE OF CORRECTION

| | | |
|---|---|---|
| PATENT NO. | : 9,739,896 B2 | Page 1 of 2 |
| APPLICATION NO. | : 15/354140 | |
| DATED | : August 22, 2017 | |
| INVENTOR(S) | : Seshadri Jagannathan et al. | |

It is certified that error appears in the above-identified patent and that said Letters Patent is hereby corrected as shown below:

Column 13, Claim 4, Line 44

Replace:
"The screen of claim 1, wherein the phosphor is selected from the group consisting of $Gd_2O_2S:Tb$, $Gd_2O_2S:Eu$, $Gd_2O_3:Eu$, $La_2O_2S:Tb$, $La_2O_2S$, $Y_2O_2S:Tb$, $CsI:Tl$, $CsI:Na$, $CsBr:Tl$, $CaWO_4$, $CaWO_4:Tb$, $BaFBr:Eu$, $BaFCl:Eu$, $BaSO_4:Eu$, $BaSrSO_4$, $BaPbSO_4$, $BaAl_{12}O_{19}:Mn$, $BaMgAl_{10}O_{17}:Eu$, $Zn_2SiO_4:Mn$, $(Zn,Cd)S:Ag$, $LaOBr$, $LaOBr:Tm$, $Lu_2O_2S:Eu$, $Lu_2O_2S:Tb$, $LuTaO_4$, $HfO_2:Ti$, $HfGeO_4:Ti$, $YTaO_4$, $YTaO_4:Gd$, $YTaO_4:Nb$, $Y_2O_3:Eu$, $YBO_3:Eu$, $YBO_3:Tb$, and $(Y,Gd)BO_3:Eu$."
With the following:
--The screen of claim 1, wherein the phosphor is selected from the group consisting of $Gd_2O_2S:Tb$, $Gd_2O_2S:Eu$, $Gd_2O_3:Eu$, $La_2O_2S:Tb$, $La_2O_2S$, $Y_2O_2S:Tb$, $CsI:Tl$, $CsI:Na$, $CsBr:Tl$, $NaI:Tl$, $CaWO_4$, $CaWO_4:Tb$, $BaFBr:Eu$, $BaFCl:Eu$, $BaSO_4:Eu$, $BaSrSO_4$, $BaPbSO_4$, $BaAl_{12}O_{19}:Mn$, $BaMgAl_{10}O_{17}:Eu$, $Zn_2SiO_4:Mn$, $(Zn,Cd)S:Ag$, $LaOBr$, $LaOBr:Tm$, $Lu_2O_2S:Eu$, $Lu_2O_2S:Tb$, $LuTaO_4$, $HfO_2:Ti$, $HfGeO_4:Ti$, $YTaO_4$, $YTaO_4:Gd$, $YTaO_4:Nb$, $Y_2O_3:Eu$, $YBO_3:Eu$, $YBO_3:Tb$, and $(Y,Gd)BO_3:Eu$.--.

Table 2, Columns 11, 12, 13, 14    Replace the entire Table 2 with the attached Table 2.

Signed and Sealed this
Nineteenth Day of December, 2017

Joseph Matal
*Performing the Functions and Duties of the
Under Secretary of Commerce for Intellectual Property and
Director of the United States Patent and Trademark Office*

TABLE 2

| Sample | Coating surface | Antistat Coating Formulation | Minimum transmittance in the 400-800 nm range (measured by coating the antistat formulation on a glass substrate) | Surface Resistivity ($\Omega/\square$) | Coating Meets Minimum Resistivity Specification < 1.0 E5 $\Omega/\square$ & Minimum Transmission Requirement |
|---|---|---|---|---|---|
| Comparative Example 1 | a film of GOS in permuthane | 1X | 95% | 1.35E+06 | No - Fail Resistivity |
| | | 2X | 94% | 3.84E+06 | No - Fail Resistivity |
| | | 4X | 92% | 3.50E+04 | No - Fail Transmission |
| | | 8X | 88% | 1.05E+04 | No - Fail Transmission |
| Comparative Example 2 | a thin film of gelatin coated over a film of GOS in permuthane | 1X | 95% | 2.00E+11 | No - Fail Resistivity |
| | | 2X | 94% | 9.65E+09 | No - Fail Resistivity |
| | | 4X | 92% | 2.20E+09 | No - Fail Resistivity & transmission |
| | | 8X | 88% | 3.55E+08 | No - Fail Resistivity & transmission |
| Comparative Example 2 | a thin film of polyvinyl alcohol coated over a film of GOS in permuthane | 1X | 95% | 8.83E+08 | No - Fail Resistivity |
| | | 2X | 94% | 4.75E+08 | No - Fail Resistivity |
| | | 4X | 92% | 1.47E+08 | No - Fail Resistivity & transmission |
| | | 8X | 88% | 1.67E+06 | No - Fail Resistivity & transmission |
| Inventive Example 1 | a thin film of PET coated over a film of GOS in permuthane layer | 1X | 95% | 5.65E+07 | No - Fail Resistivity |
| | | 2X | 94% | 2.05E+04 | Yes |
| | | 4X | 92% | 2.45E+04 | No - Fail Transmission |
| | | 8X | 88% | 9.00E+03 | No - Fail Transmission |
| Inventive Example 2 | a thin film of CDA coated over a film of GOS in permuthane layer | 1X | 95% | 7.35E+07 | No - Fail Resistivity |
| | | 2X | 94% | 1.60E+04 | Yes |
| | | 4X | 92% | 1.95E+04 | No - Fail Transmission |
| | | 8X | 88% | 8.80E+03 | No - Fail Transmission |
| Inventive Example 3 | a thin film of EVA coated over a film of GOS in permuthane layer | 1X | 95% | 2.35E+06 | No - Fail Resistivity |
| | | 2X | 94% | 5.85E+04 | Yes |
| | | 4X | 92% | 1.60E+04 | No - Fail Transmission |
| | | 8X | 88% | 3.90E+03 | No - Fail Transmission |
| Inventive Example 4 | a thin film of Butvar coated over a film of GOS in permuthane layer | 1X | 95% | 5.56E+07 | No - Fail Resistivity |
| | | 2X | 94% | 6.70E+04 | Yes |
| | | 4X | 92% | 2.20E+04 | No - Fail Transmission |
| | | 8X | 88% | 8.50E+03 | No - Fail Transmission |